Dec. 18, 1956    H. D. MAYENSCHEIN ET AL    2,774,587
APPARATUS FOR COOLING CEMENT CLINKER
Filed Sept. 30, 1952            3 Sheets-Sheet 1

INVENTOR.
HENRY D. MAYENSCHEIN
& JOHN E. VELZY
BY
ATTORNEYS

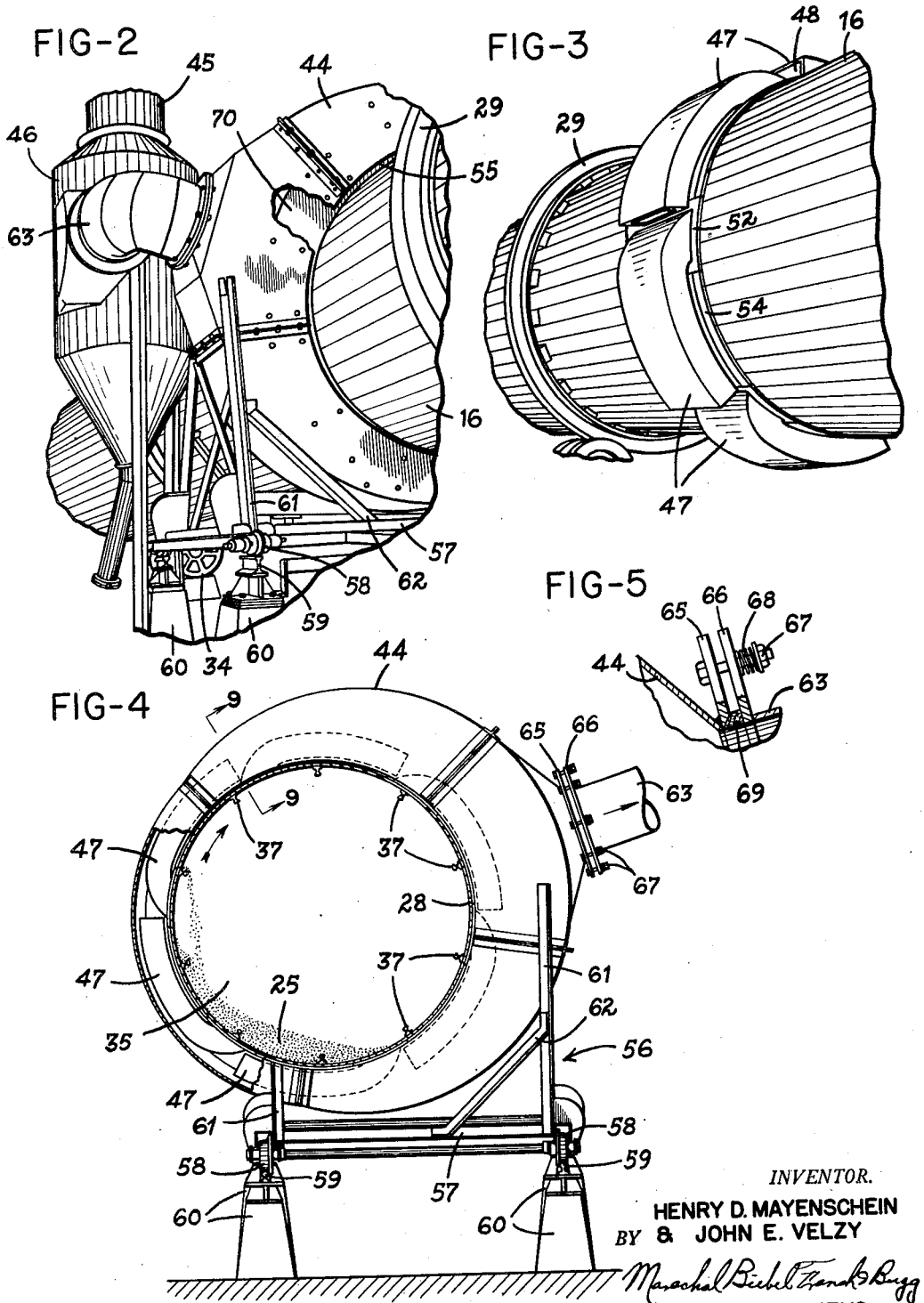

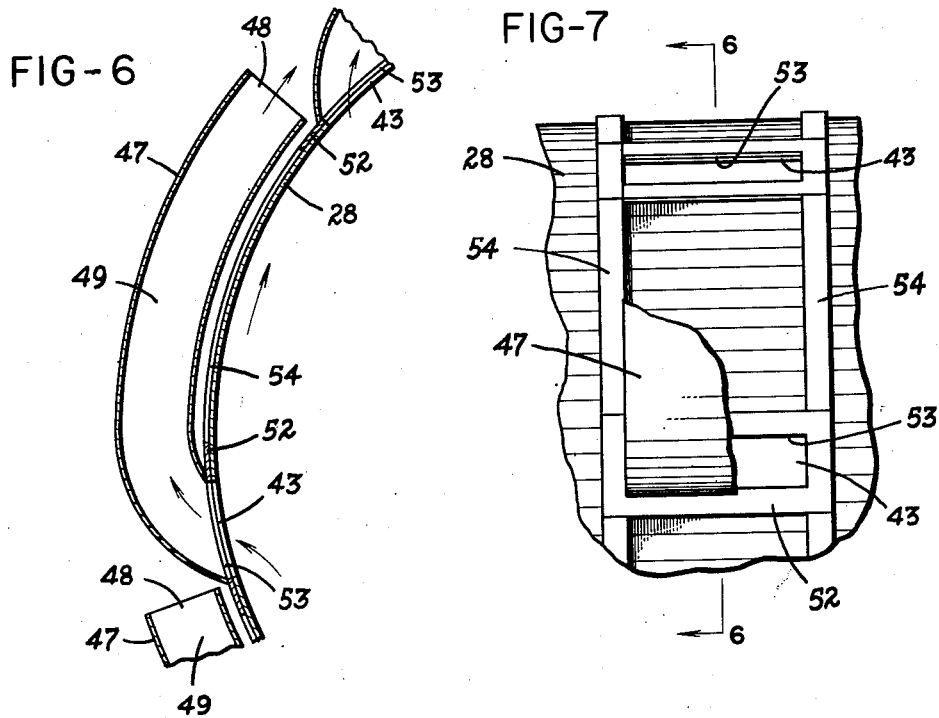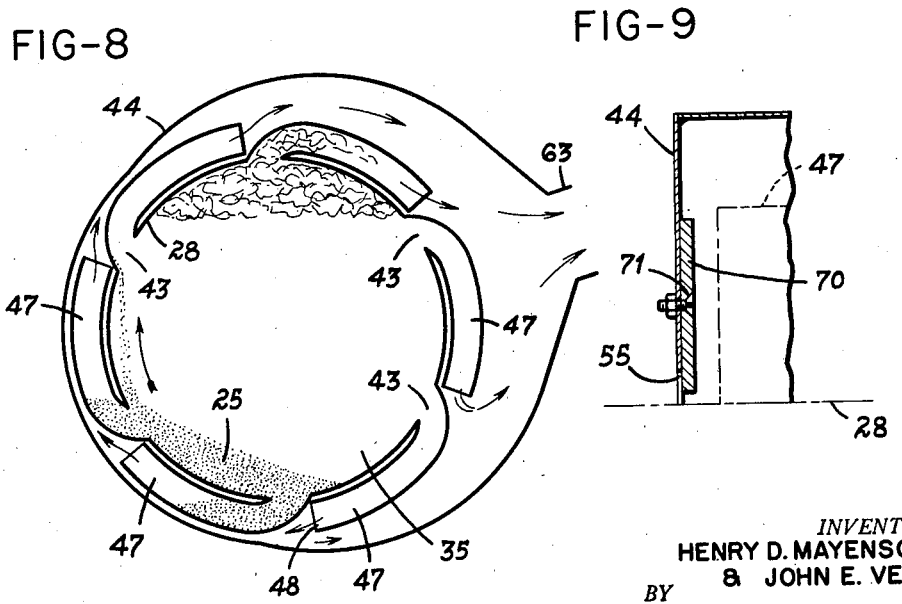

United States Patent Office 2,774,587
Patented Dec. 18, 1956

2,774,587

APPARATUS FOR COOLING CEMENT CLINKER

Henry D. Mayenschein and John E. Velzy, Fairborn, Ohio

Application September 30, 1952, Serial No. 312,222

4 Claims. (Cl. 263—32)

This invention relates to methods and apparatus for the cooling of cement clinker and the like in a rotary kiln.

The burned clinker discharged from the kiln in the manufacture of cement, which is too hot to be handled in normally available conveying equipment, is customarily cooled by passing it through a rotary cooler in which a stream of cooling fluid, ordinarily air, is continuously passed over the flowing stream of clinker in a direction contrary to that of the clinker flow. The temperature of the clinker as it emerges from the kiln is ordinarily of the order of some 2800° F. or higher and a very substantial reduction in temperature is accordingly required. Clinker of a temperature even as high as 500° F. is too hot for convenient handling or to grind well or ship after grinding. Additionally, hot cement has a tendency to dehydrate the gypsum used in its composition and to result in an unsatisfactory product, so that temperatures should so far as possible be reduced below this range. It is desirable for improved quality of the final product, furthermore, that the cooling be effected rapidly.

In rotary cooler installations of this type a substantial part of the air used to cool the clinker ordinarily is passed directly from the cooler into the kiln as secondary air to support combustion therein, thus serving the double purpose of cooling the clinker while at the same time being warmed to the temperature desirable for use in the kiln. The cooling air passed through the cooler, however, tends to become heated rapidly by contact with the stream of hot clinker so that in the upper portion of the cooler its cooling effect is considerably diminished and the amount of air necessary for effective cooling tends to be substantially greater than can usefully be employed in the kiln.

The cooling may be increased and made more effective by quenching the hot clinker in the cooler with water, but use of water introduces the additional problem that if any substantial part of the resulting water vapor passes into the kiln it reduces the temperature therein and requires undue amounts of fuel.

The result of reconciling these difficulties tends to be a compromise in which the amount of air used is less than that desirable for effective cooling while being greater than is useful for proper combustion in the kiln and, if water is used, it is at the expense of increased amounts of fuel.

Various attempts have been made to overcome these difficulties by providing for withdrawal of all or of a substantial part of the added air or other cooling fluid before it passes into the kiln. Where such fluid is withdrawn from the cooling zone in the cooler itself, it is important to prevent escape of the clinker from the cooler out of the apertures or holes in the cooler shell through which the air is withdrawn, and likewise it is desirable to avoid introducing baffles, conveyor tubes or other structure within the cooler which would tend to interfere with the progressive travel of the clinker from one end to the other.

These methods suffer from the additional defect that the cooling fluids at the point of withdrawal are ordinarily at a temperature well below that of the stream of clinker at such point and have substantial remaining unused cooling capacity which is no longer effective for cooling when the fluids are withdrawn out of the cooling area and is accordingly wasted, frequently with unnecessary expenditure of power in drawing them off.

The present invention, by way of contrast, provides a highly efficient means and method for cooling cement clinker and the like at relatively small cost by withdrawing cooling fluids from the cooling chamber at a skimming or scalping zone therein through circumferential apertures in the cylindrical surface of the cooler. The interior of the cooler is nevertheless left substantially uninterrupted in the axial direction of flow of the clinker without necessity for retaining rings, dams, bridges or similar devices. Operation is effected by gravity, without expense for power other than that already required for rotating the cooler, and no additional moving parts apt to get out of order are required. The construction furthermore is simple and rugged so that it is adapted for long life with minimum upkeep or labor.

Inasmuch as such method and apparatus provide for withdrawal of substantially all of the cooling fluids introduced in the cooler in excess of the amount of secondary air desired for the kiln, they permit use of whatever quantities of water may be found desirable for reducing temperature to the desired range. The zone of withdrawal or scalping zone is removed from the point at which secondary air passes into the kiln, so that such air is substantially unaffected, the small amounts of water vapor passing therein tending to improve rather than impair performance of the kiln.

Additionally, efficient use is made of the cooling fluids for cooling clinker even after they are withdrawn out of the cooling chamber proper. They are passed through the apertures in the wall of the cylinder into a series of skimmers defining air passages outside of the cylinder itself into which partially cooled clinker is permitted to fall as the cooler rotates, where they serve to cool the clinker further, and the clinker thus cooled is returned into the stream of hot clinker in the kiln for further lowering its temperature. Such use of the cooling gaseous fluids substantially increases the desirable rapidity of cooling.

It is accordingly one of the principal objects for the present invention to provide methods and apparatus for cooling cement clinker and the like in a rotary cooler which makes use of the cooling gases and fluids for cooling the clinker not only within the cooling chamber in the cooler but also for cooling segregated portions of such clinker outside of the cooling chamber after the gaseous fluids have been withdrawn from the cooling chamber.

It is a further object of the present invention to provide methods and apparatus by which cooling air and water may be introduced into an inter-connected rotary kiln cooler installation for manufacture of cement to an extent effective to produce the desired cooling in the cooler, without limitation by the amount of secondary air desired for efficient combustion in the kiln.

It is also an object of the invention to provide a simple, practical and economical method for use in existing rotary coolers and apparatus by which they may be changed for accomplishing the results described above substantially without reconstruction of existing equipment and without any extended period of shut-down.

Other objects and advantages of the invention will be apparent from the following description, the accompanying drawings, and the appended claims.

In the drawings—

Fig. 2 is a perspective view on a larger scale of the scalping portion of the cooler viewed from the kiln end and with a portion of the hood broken away to show construction of the hood;

Fig. 3 is a perspective view of the cooler cylinder viewed from substantially the same position as Fig. 2 with the hood and its accompanying structure removed;

Fig. 4 is a view partly in section on a plane normal to the axis of the cylinder with the hood and skimmers in place;

Fig. 5 is a fragmentary detail on a larger scale of the connection between the opening from the hood into the escape passage;

Fig. 6 is a sectional view along the line 6—6 of Fig. 7;

Fig. 7 is a view of a portion of the outer surface of the kiln at the scalping zone viewed from the side, partly broken away;

Fig. 8 is a schematic sectional view illustrating the operation of the device; and Fig. 9 is a fragmentary section of the hood on the line 9—9 of Fig. 4.

Figure 1:
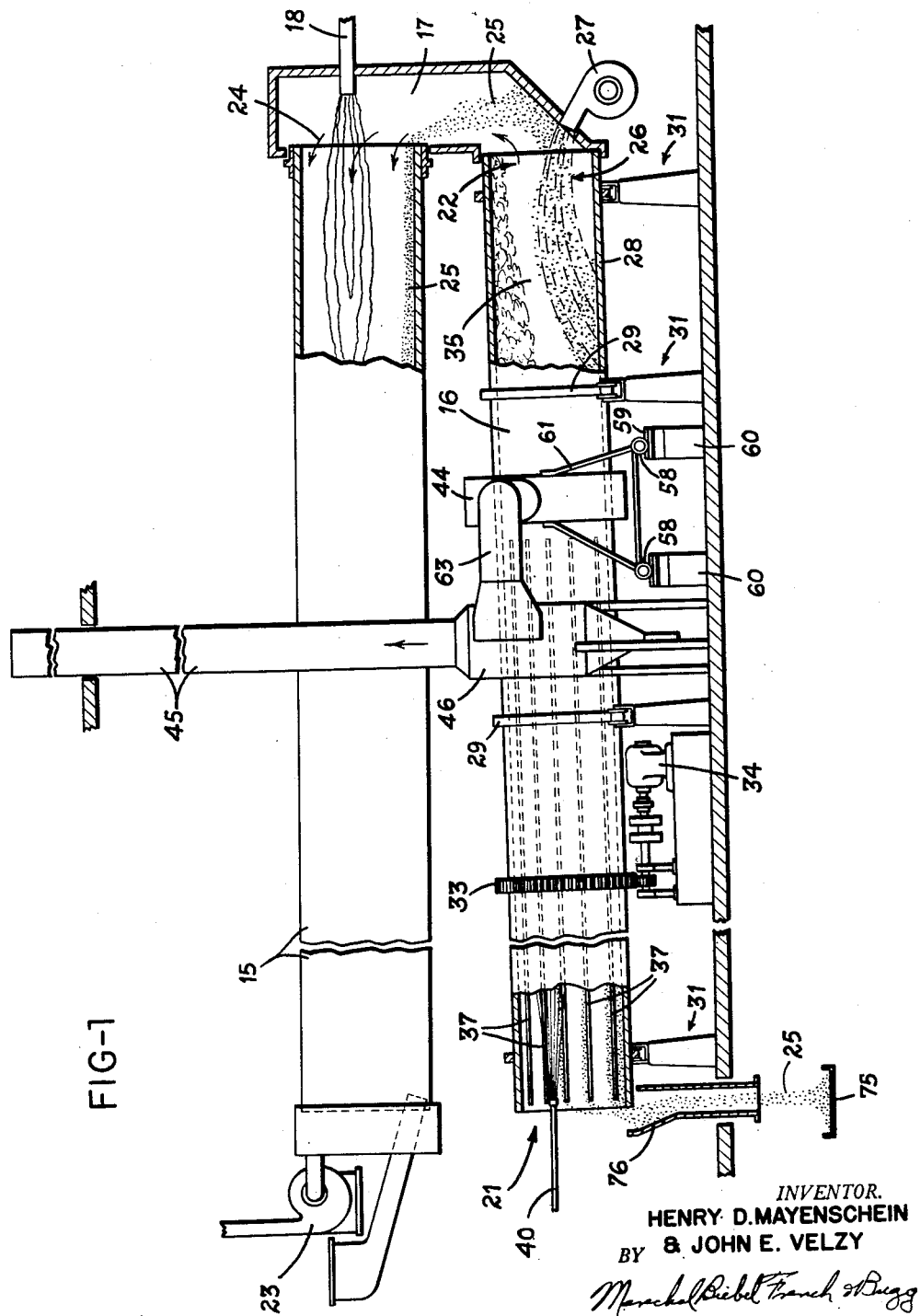
Fig. 1 is a somewhat diagrammatic view of an interconnected kiln and cooler embodying the invention, as viewed from the side, partly in section.

Referring to the drawings, which illustrate a preferred embodiment of the invention, Fig. 1 shows a typical arrangement of an inclined rotary kiln 15 communicating with a rotary cooler 16 through passage 17, the cooler extending in the opposite direction from the kiln and at a lower level. Heat for burning the cement material is provided by a fuel pipe 18 which extends into the discharge end of the kiln and may deliver any suitable fuel, such as gas, oil or coal, finely powdered coal having been found fully satisfactory in practice. The discharge end 21 of the cooler is open to the atmosphere and passage from this end of the cooler through to the inlet end 22 thereof is uninterrupted. An exhaust fan or other suitable means indicated diagrammatically at 23 is provided at the inlet end of the kiln for drawing a current of secondary air 24 through the cooler into the kiln for supporting combustion therein.

Both kiln 15 and cooler 16 are inclined slightly downward from their respective receiving ends to their discharge ends at a rate slightly in excess of one-half inch to the foot, providing a continuous downwardly inclined channel along their lower portions for continuous passage of clinker therethrough.

A continuous moving stream of clinker 25 thus passes from the discharge end of the kiln through passage 17 into the upper or clinker receiving end 22 of the cooler. If desired, a jet of cooling air 26 may be directed through the stream of clinker as it passes through passage 17 by a blower 27 indicated diagrammatically in the drawing and providing an air quench for initially cooling the clinker.

Rotary cooler 16 includes a cylindrical member 28 defining a cooling chamber therein, mounted for rotation by means of suitable tires 29 axially spaced on its exterior wall and free to rotate in bearings supported on standards indicated diagrammatically at 31. Cylinder 28 may be rotated by any suitable means such as the external gear track 33 and is shown as being driven by an electric motor 34. The stream of hot clinker 25 from the kiln is received into the cooler at its upper end 22 and as the cooler rotates is advanced slowly by gravity toward discharge end 21 through the elongated cooling chamber 35 defined by the walls of the cylinder.

The interior of cylindrical member 28 is substantially unobstructed in an axial direction throughout its length, permitting advance of the hot clinker in a slowly moving stream along the channel provided by the lower portion of the cylindrical member as it slowly rotates. As this portion of the cylinder continuously rises in the direction of rotation it carries the stream of clinker upwards so that the hot clinker particles on the side in the direction of rotation continuously roll back on the lower portions thereof, thus tumbling the clinker particles and mixing them in intimate heat-exchanging relation with the cooling air in the cooler. This lifting and tumbling effect may if desired be increased by providing lifters or baffles extending axially along the inside surface of the cooling area for such portion of its length as is desired. In the particular embodiment illustrated, these baffles 37 (Figs. 1 and 4) are formed from lengths of ordinary steel rails welded to the interior of the cooling space and extending inward a substantial distance from discharge end 21 of the cooler chamber.

As pointed out, cooling may be materially improved by quenching the hot clinker with water in addition to cooling air. For this purpose a pipe 40 connected to a water supply (not shown) may be supported with its outlet end extending into the open discharge end 21 of cylindrical member 28.

Means for withdrawing from the cooler the cooling fluids introduced therein are provided by a series of apertures or openings 43 in the circumferential well of cylinder 28 intermediate its ends, defining a skimming or scalping zone therein, from which they may pass through a hood 44 communicating with a stack 45 open at its upper end to the atmosphere. In order to prevent loss of any cement material entrained in the cooling fluids and to avoid delivering dust into the atmosphere, the connection between the hood and stack may include a dust collector 46 of any suitable type, a cyclone collector being shown in the drawings.

A series of skimmers 47 (Figs. 3 and 6) overlie and enclose each of apertures 43. These skimmers are shallow, relatively wide, curved metal structures, open at their outer discharge ends 48 and are shown as being rectangular in cross-section with their inside dimensions substantially the same as those of the respective apertures, but as is readily apparent they may be made in any convenient form. They are fastened to the exterior wall of cylindrical member 28 so as to rotate therewith, and define a series of confined passages 49 spaced circumferentially from cylindrical member 28 and extend a substantial distance circumferentially in the direction of rotation thereof, such that when any particular aperture is at a level below that of the stream of clinker the outer end 48 of the skimmer connected thereto is above the clinker level in the cylinder in order to entrap the clinker therein and prevent it from passing out such end. At the same time the discharge end 48 is continuously open for passage of cooling liquid outwardly through the cooling passages thus provided outside of the cooler chamber in a zone radially spaced therefrom.

As is apparent from Fig. 8, in operation the draft through stack 45 serves continuously to collect and withdraw the cooling air and gaseous fluids out of the cooling area in the cylinder in a plurality of spaced independent currents. The portions of the clinker falling through the apertures which are below the level of the main body of clinker are maintained in intimate heat-exchange relation with the withdrawn gaseous fluids. By reason of the curved shape of the skimmer, extending circumferentially with respect to the walls of the rotating cylinder, clinker passing into each skimmer is entrapped and temporarily segregated therein, and the continuous rotary motion of the cooler, carrying such segregated portion continuously upward, subjects the segregated clinker to further thorough tumbling and mixing in this flow of cooling fluid in the particular escape passage 49 outside of cylinder 28. A substantial amount of the clinker is withdrawn in these segregated portions into a zone outside of the cooling chamber and radially spaced therefrom with respect to the axis of rotation of the cylinder and a substantial part of the whole cooling is effected in this relatively narrow zone.

As the cylinder continues to rotate each opening 43 will pass above the upper level of the main body of clinker in the cooling area and the segregated portion of clinker in the skimmer will fall by gravity back into the main body, where by reason of having been cooled in the air passage of the skimmer to a temperature well below that of the main stream of clinker, it will be effective to cool unsegregated clinker which remained in the stream.

By reason of its relative simplicity and the fact that no structure is inside of the rotating cylindrical cooler shell to impair the through flow of the clinker, the invention is particularly well adapted for incorporation into existing installations. Each skimmer is provided with a base plate or collar 52 for fastening it to the exterior of the cylindrical shell, containing an opening 53 dimensioned to register with the edges of opening 43 in the circumference of cylinder 28 when the inner end of the skimmer is fastened thereto. To facilitate placement and for strengthening the construction spacer bars 54 having a radius equal to that of the outside of the cylinder may be preformed and fastened to the exterior of the shell by welding or other suitable means between the respective base plates.

Hood 44 (Figs. 2 and 4), which may readily be formed of sections of sheet metal, with its sides defining an annular opening 55 for passage of cylindrical member 28 therethrough, encircles the outside of the cylindrical member and the skimmers fastened thereto, radially of the skimming or scalping zone. The hood should preferably be so dimensioned as to be only slightly wider than the width of skimmers 47 in the axial direction of the cylinder and to provide fairly small although not necessarily close clearances with the skimmers as they turn inside it pursuant to the rotary movement of the cooler.

By reason of the substantial overall length of cylindrical member 28 and of the extremes of temperature to which it is subjected the position of skimmers 47 is subject to appreciable axial movement. Hood 44 is accordingly preferably mounted to permit floating movement thereof in the axial direction of the cylinder on a movable frame 56 (Figs. 2 and 4) including base 57 mounted on wheels 58 which in turn ride on short sections of rail 59 supported in suitable position on the standards 60, the hood being retained in position on the base by uprights 61 and supporting braces 62. Adjusting movement of the hood with respect to the exhaust piping 63 to the dust collector and stack is provided for by a pair of matching collars 65 and 66 (Fig. 5) on the adjacent portions of the hood and piping, flexibly connected together through a plurality of registering holes therein by a series of bolts and nuts 67 provided with helical springs 68 at their outer ends, maintaining the two plates in tight contact with packing 69 while permitting limited angular movement thereof to compensate for axial adjusting movement of the hood.

The inner surfaces of hood 44 are preferably provided with wear plates 70 (Fig. 9), which may extend radially inward of the inner edges of annular opening 55 and are shown in the drawing as being fastened thereto by bolts passing through suitable apertures and countersunk at 71 so as to provide a smooth surface free from obstructions against which the outer edges of skimmers 47 may ride as the cooler rotates, maintaining the hood in operating position axially, while the frame and wheels prevent any sideward or twisting movement thereof. The outer edges of collars 52 and spacer bars 54 form a continuous ring around the outer circumference of the shell at the scalping zone and tend, in cooperation with the inner edge of hood 44 to reduce any openings between the inner edge of the hood and the circumference of the shell so as to minimize reduction of the draft for collecting and discharging the cooling fluids through stack 45.

Although it is plain that the methods and apparatus of the invention are adaptable to rotary coolers in a wide range of sizes, and the results obtainable in any particular installation will necessarily depend on such factors as initial temperature of the clinker, length and diameter of the cooler, length and diameter of the cooler, whether or not water is used, and similar circumstances, a quick and substantial reduction in temperature at the scalping zone may be achieved by use of the invention. As illustrative of the substantial degree of such cooling effect it has been found in a rotary cooler 8 feet in diameter embodying the invention and using both a water quench and air quench in addition to secondary air, that a reduction in temperature of approximately 1000° F. is effected in a scalping or skimming zone extending less than three feet axially of the cooler. In the installation referred to the clinker passes out of the kiln at a temperature of 2800° F., which is reduced some 500° F. by an initial air quench in passage 17 so that the clinker entering the kiln is at a temperature of approximately 2300 F. to 2400 F. The particular cylinder is provided with six apertures defining the scalping zone, located approximately two-thirds of the length of the cylindrical member from the discharge end, a distance of approximately 53 feet, each aperture measuring approximately thirty inches in the axial direction with a width in the circumferential direction of approximately eight inches. They are equally spaced around the circumference of the shell, with the open end of each skimmer adjacent to the closed end of the following skimmer so that each skimmer is approximately four feet two inches long in the arcuate direction. Temperature of the clinker entering the scalping zone after having been cooled in the upper portion of the cooler chamber by the secondary air for the kiln to approximately 2000° F. leaves such zone, after portions have been segregated and cooled in the air passages defined by the skimmer and recaptured into the main body of clinker, with its temperature reduced to the order of 1000° F., having undergone a reduction in temperature of approximately 1000° F. in a short period of time.

The water comprising the water quench, which is introduced to the clinker near the discharge end of the cylinder through a one-quarter inch pipe under a sixty foot head, reduces the temperature further at this point to a temperature of some 150° F., at which the clinker particles may be picked up in the hand without undue discomfort. They thus may be discharged directly on to a rubber conveying belt or similar apparatus indicated diagrammatically at 75 (Fig. 1) through hopper 76 without risk of damage to the equipment.

The invention is also, by reason of its simplicity, particularly well adapted for incorporation into existing equipment at relatively small expense and with a minimum period of shutdown. The structure required to be added to existing equipment may be easily fabricated for relatively small cost from readily available materials, in advance of installation. Its parts are simple and are all disposed outside of the cooler, so that no structure need be added inside the cooling chamber or body of the cooler. By merely stopping operation for a few hours, therefore, the parts may be installed while the cooler cylinder remains in place without necessity for any dismantling or extended shutdown, and with minimum interference to regular production.

Where the invention is to be so incorporated into an existing installation the parts may all be preformed and the stack, dust collector and associated piping placed in position while the cooler itself is continued in normal operation. With everything thus prepared, the kiln and cooler may be shut down for a relatively short period, apertures 43 cut into the walls of the cylinder by an arc cutter and the skimmers welded or otherwise fastened to the exterior thereof, with spacer bars 54 between them. When attachment of the skimmers has been completed, the hood may be assembled in place, and operation may immediately be resumed, with a minimum period of shutdown.

While the method herein described and the form of apparatus for carrying this method into effect constitute preferred embodiments of the invention, it is to be understood that the invention is not limited to this precise method and form of apparatus, and that changes may be made in either without departing from the scope of the invention which is defined in the appended claims.

What is claimed is:

1. Cooling apparatus for cement clinker and the like comprising an elongated cylinder supported for rotation about the axis thereof with said axis slightly inclined with respect to the horizontal for gravity flow of clinker therethrough, means for introducing hot clinker particles at the higher end of said cylinder for passage therethrough and discharge from the lower end thereof, means for introducing cooling fluid endwise into said cylinder with resulting formation of hot gases therewithin, means forming a plurality of enclosed pockets mounted in angularly spaced relation on the outside of said cylinder intermediate the ends thereof, means forming a plurality of vent openings in said cylinder each connecting directly with the inner end of one of said pockets, the outer end of each of said pockets being open, said pockets extending circumferentially of said cylinder in the direction of rotation thereof a distance from said vents such that when the inner end of each thereof is below the level of said clinker particles within said cylinder the outer end is above said clinker level, a hood surrounding said cylinder and said pockets, means for rotating said cylinder in the direction from the inner ends of said pockets to the outer ends thereof to cause portions of said clinker particles to drop by gravity into successive said pockets for temporary lifting thereby exteriorly of said cylinder followed by gravity return into said cylinder from the successive rising said pockets while said hot gases pass outwardly of said cylinder into said hood from the outer ends of said pockets, and means for venting said hot gases from said hood.

2. In cooling apparatus for cement clinker and the like including an elongated cylinder supported for rotation about the axis thereof with said axis slightly inclined with respect to the horizontal for gravity flow of clinker therethrough, means for introducing hot clinker particles at the higher end of said cylinder for passage therethrough and discharge from the lower end thereof, and means for introducing cooling fluid into said cylinder with resulting formation of hot gases therewithin, the combination of means defining a plurality of vent openings in said cylinder intermediate the ends thereof, a plurality of tubular members forming skimmers mounted on the outer surface of said cylinder with the inner end of each thereof connected with one of said vent openings and with the outer ends thereof open, each of said skimmers extending for a substantial angular distance from the inner end thereof generally concentrically with said cylinder, means for rotating said cylinder in the direction of extension of said skimmers to cause successive portions of said clinker particles to drop by gravity into successive said vent openings for temporary lifting within said skimmers on the outside of said cylinder and then to be dropped back into said cylinder through the rising said vent openings while said hot gases pass outwardly of said cylinder from the outer ends of said skimmers, and the angular extent of each of said skimmers being such that when the inner end thereof lies below the level of said clinker particles within said cylinder the outer end thereof will be at a level preventing gravity discharge of said clinkers therethrough.

3. Cooling apparatus for cement clinker and the like comprising an elongated cylinder supported for rotation about the axis thereof with said axis slightly inclined with respect to the horizontal for gravity flow of clinker therethrough and having a continuous interior surface substantially uninterrupted in the axial direction thereof providing for progressive travel of the clinker therethrough, means for introducing hot clinker particles at the higher end of said cylinder for passage therethrough and discharge from the lower end thereof, means for introducing cooling fluid endwise into said cylinder with resulting formation of hot gases therewithin, means forming a plurality of vent openings in the cylindrical surface of said cylinder at a position intermediate the ends thereof forming a scalping zone therein, means having closed walls and open ends forming a plurality of pockets mounted on the outside of said cylinder surrounding each of said vent openings and extending circumferentially of said cylinder a distance such that when the inner end of said pocket is below the level of said clinker particles in said cylinder the outer end is at a level preventing gravity discharge of said particles outwardly of said pocket, a hood surrounding said cylinder and said pockets, means for rotating said cylinder in the direction from the inner ends of said pockets to the outer ends thereof to cause clinker particles to drop by gravity into successive said pockets for temporary lifting thereby exteriorly of said cylinder followed by gravity return into said cylinder from the successive rising said pockets while said hot gases pass outwardly of said cylinder into said hood from the outer ends of said pockets, and means for venting said hot gases from said hood.

4. A cooler adapted to convey therethrough cement clinker and the like received from a kiln comprising a shell forming a rotary cylinder defining a cooling space including radially spaced outlet openings in said cylinder intermediate its ends, means forming an elongated openended skimmer associated with each of said openings and defining a cooling fluid passage disposed outside of and extending generally circumferentially with respect to said shell and communicating with said cooling space through said opening for receiving and retaining clinker particles from said cooling space when the respective opening is at the lower portion of its rotation and returning said particles through said opening as rotation of said shell lifts said opening above the level of clinker in said shell, means for rotating said cylinder in the direction from said openings to the outer ends of the associated said skimmers to cause tumbling of said clinker particles in said passages and intimate intermixture thereof with cooling fluid passing therethrough, each of said skimmers having a length and diameter coordinated with the diameter of said cylinder such that outward escape of said clinker particles therefrom is prevented, and means for causing passage of said cooling fluid into said shell through said cooling space and out through said cooling fluid passages.

References Cited in the file of this patent

UNITED STATES PATENTS

| | | |
|---|---|---|
| 856,770 | Cummer | June 11, 1907 |
| 1,210,510 | Mason | Jan. 2, 1917 |
| 1,902,517 | Newhouse | Mar. 21, 1933 |
| 1,984,315 | Morris | Dec. 11, 1934 |
| 2,174,896 | Sackett | Oct. 3, 1939 |
| 2,264,646 | Spears | Dec. 2, 1941 |
| 2,582,547 | Kronstad | Jan. 15, 1952 |